United States Patent Office 3,134,800
Patented May 26, 1964

3,134,800
AMINO AROMATIC PHOSPHONATES AND PROCESS OF PREPARATION
Fred Kagan and Robert D. Birkenmeyer, Kalamazoo, Mich., assignors to The Upjohn Company, Kalamazoo, Mich., a corporation of Michigan
No Drawing. Filed Oct. 21, 1957, Ser. No. 691,155
39 Claims. (Cl. 260—456)

This invention pertains to new organic compounds and to processes and novel intermediates useful in the preparation thereof. The invention more particularly pertains to N,N-bis-(2-haloethyl)-aminoaromaticphosphonates which, in the free dibasic acid form, can be represented by the following general structural formula:

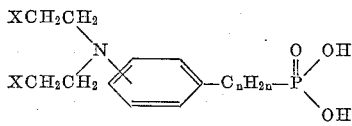

wherein X is a halogen having an atomic weight between 35 and 127, e.g., chlorine, bromine and iodine; and wherein $n$ is an integer from zero to eight, inclusive. When $n$ is one or more, —$C_nH_{2n}$— is a straight-chain or branched-chain lower-alkylene radical. The benzene-ring substitutents can be in ortho, meta, or para position with respect to each other.

The new compounds of this invention include not only the free dibasic acids represented by the above general structural formula, but also di-lower-alkyl esters (neutral esters) and mono-lower-alkyl esters (acid esters) of said acids, in which neutral and acid esters the lower-alkyl radicals are, e.g., methyl, ethyl, n-propyl, isopropyl, n-butyl, and the like; as well as acid and neutral salts of the dibasic acids and salts of the acid esters, the salts preferably being those with pharmacologically acceptable cations, such as sodium, potassium, lithium, calcium, strontium, magnesium, aluminum, ammonium, and substituted ammonium, e.g., methylammonium, diethylammonium, trimethylammonium, diethanolammonium, pentamethyleneammonium, and the like.

The invention contemplates the replacement of the acidic hydrogens with like or unlike substituents. Hence, one can prepare, for example, an alkali metal salt of a mono ester, or the individual alkyl radicals of a diester can be different.

The N,N-bis-(2-haloethyl)-aminoaromaticphosphonates of this invention are related to nitrogen mustards and possess the general chemical reactivities ascribable to the bis-(2-chloroethyl)-amino group. Nitrogen mustards, bis- and tris-(2-chloroethyl)-amines and their sulfide analogues are well known for their unusual reactivity with living cells. In low concentrations, simple nitrogen mustards inhibit the anabolic and mitotic activities of proliferating cells; they also induce chromosomal aberrations and gene mutations. At higher concentrations, cellular disfunctions occur which are unlike those produced by other types of chemical agents. The effects are strikingly similar to the cellular damage caused by biologically excessive dosages of X-radiation. Hence, the usefulness of nitrogen mustard derivatives in the treatment of proliferating tumors is indicated by this radiomimetic effect.

The novel compounds of this invention are useful as antifungal and antibacterial agents for the control of phytopathogenic fungi and bacteria such as *Xanthomonas vescicatoria, Penicillium oxalicum,* Verticillium sp., and *Fusarium lycopersici.* They also show activity against yeast organisms such as *Kloeckera brevis* and *Torula utilis.* Moreover, their mutagenic character provides controllable means for inducing mutations in microorganisms. Since the rate of gene mutation is accelerated and therefore the chance of an improved strain occurs more frequently than under natural conditions, the selective process is enhanced. This property is especially valuable in the development of mutant strains of antibiotic-producing or acid-producing organisms such as *Streptomyces, Penicillium,* and *Aspergillae* where more productive strains are continually being sought.

The inherent alkylating properties of the compounds of the invention make them useful as textile chemicals, as adhesives, and for the treatment of leather. They may be polymerized to yield new plastics.

It is generally known that nitrogen mustards have been utilized successfully in the treatment of malignant conditions such as certain types of chronic leukemias. Their use has been accompanied by undesirable side effects and concomitant degeneration of hematopoietic tissues such as bone marrow and spleen. The diethyl p-[N,N-bis-(2-iodoethyl)-amino]benzylphosphonate of this invention is an anabolic and mitotic inhibitor and possess the same utility against chronic leukemias as nitrogen mustards of the prior art.

The efficacy of the compounds of the invention for the control of anabolic processes in malignant tissues is shown by their effect on protein synthesis in tissue cultures. Growth of an Eagle's KB human carcinoma tissue culture was inhibited fifty percent by a two gamma per milliliter cocentration of diethyl p-[N,N-bis-(2-iodoethyl)-amino]-benzylphosphonate.

The compounds of the invention exhibit similar superior cytostatic activity against several forms of animal tumors. For example: mice implanted with Ehrlich ascites and subsequently treated with ten milligrams per kilogram of diethyl p-[N,N-bis-(2-iodoethyl)-amino]-benzylphosphonate starting at 24, 48, and 72 hours after implantation survived two and one-half times longer than untreated mice. If treatment was delayed until the fourth, fifth, or even the sixth day after implantation, a dosage of ten milligrams per kilogram produced survival times one and one-half that of controls. When the compound was administered at the rate of twenty milligrams per kilogram, survival time was nearly three times longer than controls. When treatment at the ten milligrams per kilogram dosage began on the first day after implantation two of twenty mice survived 86 days. This is in contrast to the average survival time of 14 to 17 days for controls. When the dosage was twenty milligrams per kilogram and treatment began on the fourth day, six out of twenty mice survived 86 days. The same type of results have been obtained with mice implanted with Sarcoma 180 ascites.

In rats, diethyl p-[N,N-bis-(2-iodoethyl)-amino]-benzyl-phosphonate gave 63 percent inhibition of Walker adenocarcinoma and two out of five test animals had no tumors. Survival times of test animals were significantly prolonged.

A more extensive follow-up test employing larger numbers of animals gave results as shown in the table.

*Effect of Diethyl p-[N,N-Bis-(2-Iodoethyl)-amino]-Benzylphosphonate on Walker Adenocarcinoma*

| Compound | Dose, mg./kg./day | Number of rats | Average diameter of tumor (mm.) | Number of "no takes" and/or regressions | Number of deaths | Percentage inhibition |
|---|---|---|---|---|---|---|
| Diethyl p-[N,N-bis-(2-iodo-ethyl)-amino]-benzyl-phosphonate | 15 | 10 | 0.0 | 9 | 1 | 100 |
| Do | 10 | 10 | 0.0 | 9 | 1 | 100 |
| Do | 5 | 10 | 13.8 | 1 | 0 | 38 |
| Control | | 10 | 22.1 | 1 | 0 | |

The methanesulfonyloxy (mesyloxy) intermediates of the invention posses cytotoxic activity. According to generally accepted concepts, bis-(2-haloethyl)-amino and bis-(2-mesyloxyethyl)-amino groups are converted to the reactive ethylenimino group which functions as an alkylating agent and combines readily with active hydrogens of many compounds of biological importance, such as: compounds having α-amino groups, imidazole groups, sulfhydryl groups, sulfide groups, phenolic groups, epsilon-amino groups, and imino groups of amino acids and peptides. Moreover the ability of nitrogen mustards to alkylate the amino groups of adenosine and thiamine and the pyridine nitrogen of nicotinic acid and pyridoxine is thought to be related to their cytotoxic activity.

The novel compounds of the invention are conveniently prepared by 2-hydroxyethylation of dialkyl ortho-, meta-, or para-aminoaromaticphosphonates to produce N,N-bis-(2-hydroxyethyl)-aminoaromaticphosphonates, and then substituting chlorine, bromine, or iodine for the hydroxyl group.

The starting materials employed in preparing the new compounds of this invention are substituted anilines having the following general structural formula:

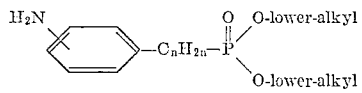

wherein $n$ is an integer from zero to eight, inclusive, and wherein the lower-alkyl radicals are of the kind noted above.

Starting materials in which $n$ equals 1 to 8 and the amino group is in the para position can advantageously be prepared by condensing a phenylalkyl halide with a trialkyl phosphite to produce a dialkyl phenylalkylphosphonate followed by nitration and reduction of the nitro group to an amino group.

The condensation of a phenylalkyl halide with a trialkyl phosphite can be carried out as set forth in Organic Reactions, vol. 6, pages 276, 286, and 287; John Wiley and Sons, Inc. (1951). Suitable phenylalkyl halides are: benzyl bromide, phenethyl chloride, 2-phenylpropyl bromide, α-methylbenzyl bromide, phenethyl bromide, α-ethylbenzyl bromide, 3-phenyl-2-bromopropane, 3-phenylpropyl bromide, 4-phenylbutyl bromide, 2-phenyl-2-bromobutane, 3-phenylbutyl bromide, α-isopropylbenzyl bromide, 2-methyl-3-phenylpropyl bromide, 1-methyl-3-phenylpropyl chloride, 5-phenylpentyl bromide, 2-bromo-5-phenylpentane, 6-phenylhexyl bromide, 2-bromo-6-phenylhexane, 2-methyl-5-phenylpentyl iodide, 7-phenylheptyl bromide, 2,4-dimethyl-5-phenylpentyliodide, and 4-phenyl-1-bromooctane. Suitable trialkyl phosphites include trimethyl, triethyl, tri-n-propyl, triisopropyl, and tri-n-butyl phosphites.

Nitration of the dialkyl phenylalkylphosphonates thus obtained can be effected with a suitable nitrating agent such as fuming nitric acid, or a mixture of nitric acid and a suitable water binding agent such as sulfuric acid to give good yields of the corresponding dialkyl para-nitrophenylalkylphosphonates. The nitro group is then reduced to an amino group by catalytic hydrogenation, chemical reduction with ferrous sulfate in alkaline solution, electrolytic reduction, or by other reduction methods commonly known in the art, to give dialkyl para-aminophenylalkylphosphonates.

When ortho and meta isomers of the foregoing para-aminophenylalkylphosphonates are desired, the synthesis is begun with an ortho- or meta-acylamidophenylalkyl halide such as ortho-acetamidobenzyl chloride, meta-acetamidobenzyl chloride, and ortho-acetamidophenethyl chloride. The ortho- or meta-acylamidophenylalkyl halide is condensed with a tri-alkyl phosphite to produce the phosphonate, and the acyl group then removed by hydrolysis with a strong acid. This gives the ortho- and meta-aminophenylalkylphosphonic acids (the ester groups are also hydrolyzed) in the form of their acid addition salts. These acid addition salts are then reesterified with a lower alkanol in the presence of an acid catalyst, and then neutralized with alkali to give the dialkyl ortho- and meta-aminophenylalkylphosphonates.

Ortho-, meta-, and para-aminophenylphosphonates (compounds wherein $n$ is zero) are known in the art [see J.A.C.S. 71, 4021–4022 (1949); and J.A.C.S. 73, 5658–5660 (1951)].

The dialkyl aminoaromaticphosphonate starting materials can be N-alkylated with a 2-hydroxyethylating agent such as ethylene oxide or an ethylene halohydrin such as ethylene chlorohydrin or bromohydrin to produce the dialkyl N,N-bis-(2-hydroxyethyl)-aminoaromaticphosphonate intermediates. Ethylene oxide has given good results in the presence of one normal acetic acid at room temperature when the reaction was allowed to proceed over an interval of sixteen hours. Higher or lower temperatures and shorter or longer times, respectively, can be used but ordinarily it will not be necessary or desirable to use temperatures below about ten degrees centigrade or above about 150 degrees centigrade.

The dialkyl N,N-bis-(2-hydroxyethyl)-aminoaromaticphosphonates are readily hydrolyzed with acids to give the free dibasic acids or with alkali to give the acid esters.

The compounds of the invention can now be prepared by halogenating the monoalkyl or dialkyl N,N-bis-(2-hydroxyethyl)-aminoaromaticphosphonates or the free dibasic acids. The chloro (or bromo) compounds can be prepared by direct halogenation using a mixture of chloroform, pyridine hydrochloride (or hydrobromide), dry pyridine, and thionyl chloride (or bromide); the iodo compounds by indirect halogenation involving mesylation followed by metathesis. The direct halogenation and mesylation reactions carried out with the free dibasic acids or the acid esters should be followed by hydrolysis to hydrolyze any acid halide or mixed anhydride that may be formed.

In the preparation of bis-(2-iodoethyl) compounds of the invention, it is convenient to mesylate the 2-hydroxyethyl intermediate with methanesulfonyl chloride or methanesulfonyl bromide (mesyl chloride or mesyl bromide) to form the N,N-bis-(2-mesyloxyethyl) intermediate, which in turn is metathesized with an alkali metal iodide such as sodium, potassium, or lithium iodide to produce the desired iodo compound. When the free dibasic acids or acid esters are used, the metathesis should be followed by hydrolysis of any mixed anhydride formed. Similarly, the bis-(2-iodoethyl) compounds can be prepared metathetically from the bis-(2-chloroethyl) or bis-(2-bromoethyl) compounds of the invention.

The free dibasic acids or acid esters can be converted into monoesters, diesters including mixed esters, ester-salts, acid salts, and neutral salts by the usual procedures of esterification and neutralization known in the art.

The following examples are illustrative of process and products of the present invention, but are not to be construed as limiting.

EXAMPLE 1

A. *Preparation of Diethyl p-[N,N-bis-(2-Hydroxyethyl)-Amino]-Benzylphosphonate*

In a two-liter, three-necked flask fitted with a stirrer were placed 100 grams (0.411 mole) of diethyl p-aminobenzylphosphonate, 411 milliliters of chilled (about five degrees centigrade) one normal acetic acid and 200 milliliters of chilled (about five degrees centigrade) ethylene oxide. The flask was stoppered loosely and allowed to stand for sixteen hours at 25 degrees centigrade.

The flask was then suspended in a water bath at thirty degrees centigrade while the excess ethylene oxide was removed under reduced pressure. The mixture was cooled in an ice bath and made alkaline with aqueous sodium carbonate.

The mixture was extracted with three 300-milliliter portions of methylene chloride and the combined extracts dried over anhydrous magnesium sulfate. After filtering the solution, and removing the solvent under reduced pressure at a pot temperature of about thirty degrees centigrade, there was obtained a substantially quantitative yield of crude diethyl p-[N,N-bis-(2-hydroxyethyl) - amino] - benzylphosphonate, as a viscous amber oil.

B. *Preparation of Diethyl p-[N,N-bis-(2-Mesyloxyethyl)-Amino]-Benzylphosphonate*

A mixture of five grams (0.0151 mole) of the diethyl p - [N,N - bis - (2 - hydroxyethyl) - amino] - benzylphosphonate of part A, fifty milliliters of dry benzene, and 5.5 grams (0.0695 mole) of dry pyridine was stirred at a temperature of five degrees centigrade while five grams (0.0436 mole) of mesyl chloride was added, dropwise, over an interval of sixteen minutes. The stirring was continued at a temperature of five to ten degrees centigrade for sixteen hours. The benzene was removed under reduced pressure at a pot temperature less than thirty degrees centigrade, and the residue was poured over cracked ice. The ice was allowed to melt and the mixture was then extracted with three twenty-milliliter portions of methylene chloride. After the combined methylene chloride extracts had been dried with anhydrous magnesium sulfate, filtered and distilled, six grams (95 percent yield) of crude diethyl p-[N,N-bis-(2-mesyloxyethyl) - amino] - benzylphosphonate was obtained as a dark amber oil.

Instead of using mesyl chloride as in part B above, other sulfonic acid halides capable of introducing a leaving group can be used, for example, ethanesulfonyl chloride or a like lower-alkyl sulfonyl chloride, p-toluenesulfonyl chloride (tosyl chloride), p-bromophenylsulfonyl chloride (brosyl chloride), benzenesulfonyl chloride, and benzylsulfonyl chloride. The bis-(2-sulfonyloxyethyl) compounds so obtained can be used in lieu of the bis-(2-mesyloxyethyl) compound for the indirect iodination of part C below.

C. *Preparation of Diethyl p-[N,N-bis-(2-iodoethyl)-Amino]-Benzylphosphonate*

Five grams (0.0118 mole) of the diethyl p-[N,N-bis-(2-mesyloxyethyl)-amino]-benzylphosphonate of part B and 3.54 grams (0.0236 mole) of sodium iodide were dissolved in 65 milliliters of acetone. The reaction mixture was shaken in the dark at 25 degrees centigrade for thirty hours. Precipitated sodium methanesulfonate was removed by filtration. The filtrate was concentrated under reduced pressure, keeping the pot temperature less than forty degrees centigrade. A quantitative yield of crude diethyl p-[N,N-bis-(2-iodoethyl)-amino]-benzylphosphonate was obtained as a dark amber semisolid. This material was dissolved in methylene chloride and chromatographed on a magnesium silicate column using a 7:3 (by volume) technical hexane-acetone mixture for elution. Three grams of purified diethyl p-[N,N-bis-(2-iodoethyl) - amino] - benzylphosphonate was recovered from the major eluate. This product on recrystallization from petroleum ether melted at 62–64 degrees centigrade.

The bis-(2-iodoethyl) compound of this example can also be prepared by substituting the bis - (2 - mesyloxyethyl) starting material by the corresponding bis-(2-chloroethyl) or bis-(2-bromoethyl) compound.

*Analysis.*—Calc'd for $C_{15}H_{24}I_2NO_3P$: C, 32.69; H, 4.39; N, 2.54; P, 5.62; I, 46.05. Found: C, 32.48; H, 4.75; N, 2.56; P, 5.38; I, 44.61.

EXAMPLE 2

*Preparation of Diethyl p-[N,N-bis-(2-Chloroethyl)-Amino]-Benzylphosphonate*

Into a two-liter, three-necked flask fitted with stirrer and thermometer were placed one liter of chloroform, 25 grams of dry pyridine hydrochloride, twenty milliliters of dry pyridine, and 75 milliliters of thionyl chloride. The heat generated by the mixture was dissipated and the temperature kept at about 25 degrees centigrade by employing an ice bath. A second solution was prepared by dissolving ten grams (0.03 mole) of the diethyl p - [N,N - bis - (2 - hydroxyethyl) - amino] - benzylphosphonate of Example 1, part A in 200 milliliters of chloroform. This solution was added dropwise with stirring to the former over an interval of two hours. In the absence of external cooling the temperature of the reaction mixture rose from about 25 degrees centigrade to 30–32 degrees centigrade. The chloroform, excess thionyl chloride, and pyridine were then concentrated under reduced pressure at a pot temperature of about 25 degrees centigrade. The dark colored residue was mixed with 500 milliliters of methylene chloride, cooled to fifteen degrees centigrade, and washed with three 200-milliliter portions of ice water. The combined washes were in turn extracted with methylene chloride. This methylene chloride extract and the original 500-milliliter solution were combined, dried with anhydrous magnesium sulfate, filtered, and concentrated under reduced pressure yielding 9.8 grams of a dark, greenish-black oil. This black oil was dissolved in methylene chloride and chromatographed on a magnesium silicate column using a 9:1 (by volume) petroleum ether-acetone mixture for elution. Evaporation of the major eluate yielded six grams of pale amber oil which crystalized upon scratching. Recrystallization from petroleum ether yielded crystalline diethyl p-[N,N-bis-(2-chloroethyl)-amino]-benzylphosphonate having a melting point of 58–59 degrees centigrade and the following analysis:

*Analysis.*—Calc'd for $C_{15}H_{24}Cl_2NO_3P$: C, 48.92; H, 6.57; N, 3.80; Cl, 19.26; P, 8.41. Found: C, 48.62; H, 6.44; N, 3.79; Cl, 18.43; P, 8.49.

EXAMPLE 3

*Preparation of Diethyl p-[N,N-bis-(2-Bromoethyl)-Amino]-Benzylphosphonate*

Following the procedure of Example 2, substituting the thionyl chloride by thionyl bromide, and pyridine hydrochloride by pyridine hydrobromide, diethyl p-[N,N-bis - (2 - bromoethyl) - amino] - benzylphosphonate is obtained.

EXAMPLE 4

A. *Preparation of Diethyl 3-{p-[N,N-bis-(2-Hydroxyethyl)-Amino]-Phenyl}-Propylphosphonate*

Following the procedure of Example 1, part A, but substituting diethyl 3 - (p - aminophenyl)propylphosphonate for diethyl p - aminobenzylphosphonate, diethyl 3 - {p - [N,N - bis - (2 - hydroxyethyl) - amino] - phenyl}-propylphosphonate was obtained as a viscous oil.

*Analysis.*—Calc'd for $C_{17}H_{30}NO_5P$: C, 56.81; H, 8.41; N, 3.90; P, 8.62. Found: C, 55.66; H, 8.44; N, 3.74; P, 8.06.

B. *Preparation of Diethyl 3-{p-[N,N-bis-(2-Mesyloxyethyl)-Amino]-Phenyl}-Propylphosphonate*

A solution of 7.2 grams (0.02 mole) of the diethyl 3 - {p - [N,N - bis - (2 - hydroxyethyl) - amino] - phenyl}-propylphosphonate of part A in 75 milliliters of dry benzene and 5.5 grams (0.0695 mole) of dry pyridine was cooled to five degrees centigrade. Five grams (0.0436 mole) of mesyl chloride was gradually added to the cooled solution over about fifteen minutes and the mixture stirred for sixteen hours at five to ten degrees centigrade. The reaction mixture was then filtered, the benzene removed by distillation at a pot temperature of 25–30 degrees centigrade, poured over 100 grams of cracked ice, stirred until the ice melted, and extracted with methylene chloride. The methylene chloride extract was dried over anhydrous magnesium sulfate, filtered, and the solvent evaporated, yielding 9.8 grams (95 percent yield) of diethyl 3-{p-[N,N-bis-(2-mesyloxyethyl) - amino] - phenyl} - propylphosphonate as a dark amber oil.

Instead of using mesyl chloride as in part B above, other sulfonic acid halides capable of introducing a leaving group can be used, for example, ethanesulfonyl chloride or a like lower-alkyl sulfonyl chloride, p-toluenesulfonyl chloride (tosyl chloride), p-bromophenylsulfonyl chloride (bosyl chloride), benzenesulfonyl chloride, and benzylsulfonyl chloride. The bis-(2-sulfonyloxyethyl) compounds so obtained can be used in lieu of the bis-(2-mesyloxyethyl) compound for the indirect iodination of part C below.

C. Preparation of Diethyl 3-{p-[N,N-bis-(2-Iodoethyl)-Amino]-Phenyl}-Propylphosphonate A solution of 6.07 grams (0.0118 mole) of the diethyl 3 - {p - N,N - bis - (2 - mesyloxyethyl) - amino]-phenyl}-propylphosphonate of part B and 3.54 grams (0.0236 mole) of sodium iodide in 65 milliliters of acetone was kept in darkness in an atmosphere of nitrogen gas for seven days at room temperature and then filtered to remove the precipitated sodium methanesulfonate. The solution was evaporated under vacuum keeping the temperature below 35 degrees centigrade. The residual oil was dissolved in methylene chloride and the solution was filtered and evaporated to dryness. The resulting crude product was chromatographed as in Example 1, part C, and the purified diethyl 3-{p-[N,N-bis-(2-iodoethyl) - amino] - phenyl}-propylphosphonate was thus obtained as a thick amber oil.

The bis-(2-iodoethyl) compound of this example can also be prepared by substituting the bis - (2 - mesyloxyethyl) starting material by the corresponding bis-(2-chloroethyl) or bis-(2-bromoethyl) compound.

EXAMPLE 5

*Preparation of Diethyl 3-{p-[N,N-bis-(2-Chloroethyl)-Amino]-Phenyl}-Propylphosphonate*

Following the procedure of Example 2, substituting the diethyl p-[N,N-bis-(2-hydroxyethyl)-amino]-benzylphosphonate by the diethyl 3-{p-[N,N-bis-(2-hydroxyethyl)-amino]-phenyl}-propylphosphonate of Example 4, part A, diethyl 3-{p-[N,N-bis-(2-chloroethyl)-amino]-phenyl}-propylphosphonate was obtained.

EXAMPLE 6

*Preparation of Diethyl 3-{p-[N,N-Bis-(2-Bromoethyl)-Amino]-Phenyl}-Propylphosphonate*

Following the procedure of Example 3, substituting the diethyl p-[N,N-bis-(2-hydroxyethyl)-amino]-benzylphosphonate by the diethyl 3-{p-[N,N-bis-(2-hydroxyethyl)-amino]-phenyl}-propylphosphonate of Example 4, part A, diethyl 3-{p-[N,N-bis-(2-bromoethyl)-amino] - phenyl}-propylphosphonate is obtained.

EXAMPLE 7

A. Preparation of Diethyl p-[N,N-Bis-(2-Hydroxyethyl)-Amino]-Phenethylphosphonate Into a two-liter, three-necked flask fitted with a stirrer were placed 92 grams (0.358 mole) of diethyl p-aminophenethylphosphonate, 358 milliliters of chilled (about five degrees centigrade) one normal acetic acid, and 100 grams (2.27 moles) of chilled (about five degrees centigrade) ethylene oxide. The flask was stoppered loosely and allowed to stand for sixteen hours at 24 degrees centigrade. The flask was then suspended in a waterbath at thirty degrees centigrade while the excess ethylene oxide was removed under reduced pressure. The reaction mixture was cooled in an ice bath and made alkaline with aqueous sodium carbonate. The mixture was extracted with three 300-milliliter portions of methylene chloride and the combined extracts dried over anhydrous magnesium sulfate. After filtering the solution, the solvent was distilled under reduced pressure at a pot temperature of about thirty degrees centigrade, yielding 104 grams (84 percent yield) of crude diethyl p-[N,N-bis-(2-hydroxyethyl)-amino]-phenethylphosphonate as a dark amber oil.

B. Preparation of Diethyl p-[N,N-Bis-(2-Mesyloxyethyl)-Amino]-Phenethylphosphonate The procedure of Example 1, part B was repeated, substituting 104 grams (0.30 mole) of the diethyl p-[N,N-bis-(2-hydroxyethyl) - amino] - phenethylphosphonate of part A for the diethyl p-[N,N-bis-(2-hydroxyethyl)-amino]-benzylphosphonate, and using 75 grams (0.66 mole) of mesyl chloride, one liter of dry benzene, 110 grams (1.39 moles) of dry pyridine, and three 200-milliliter portions of methylene chloride. There was thus obtained 120 grams (80 percent yield) of diethyl p-[N,N-bis-(2-mesyloxyethyl)-amino]-phenethylphosphonate as a dark amber oil.

Instead of using mesyl chloride as in part B above, other sulfonic acid halides capable of introducing a leaving group can be used, for example, ethanesulfonyl chloride or a like lower-alkyl sulfonyl chloride, p-toluenesulfonyl chloride (tosyl chloride), p-bromophenylsulfonyl chloride (brosyl chloride), benzenesulfonyl chloride, and benzylsulfonyl chloride. The bis-(2-sulfonyloxyethyl) compounds so obtained can be used in lieu of the bis-(2-mesyloxyethyl) compound for the indirect iodination of part C below.

C. Preparation of Diethyl p-[N,N-Bis-(2-Iodoethyl)-Amino]-Phenethylphosphonate Following the procedure of Example 1, part C, substituting 120 grams (0.24 mole) of the diethyl p-[N,N-bis-(2-mesyloxyethyl)-amino]-phenethylphosphonate of part B for the diethyl p-[N,N-bis-(2-mesyloxyethyl)-amino]-benzylphosphonate, and using 200 grams (1.33 moles) of sodium iodide and three liters of acetone, diethyl p-[N,N-bis-(2-iodoethyl)-amino]-phenethylphosphonate was obtained as a pale yellow oil.

The bis(2-iodoethyl) compound of this example can also be prepared by substituting the bis-(2-mesyloxyethyl) starting material by the corresponding bis-(2-chloroethyl) or bis-(2-bromoethyl) compound.

EXAMPLE 8

*Preparation of Diethyl p-[N,N-Bis-(2-Chloroethyl)-Amino]-Phenethylphosphonate*

Following the procedure of Example 2, substituting the diethyl p-[N,N-bis(2-hydroxyethyl)-amino]-benzylphosphonate by the diethyl p-[N,N-bis-(2-hydroxyethyl)-amino]-phenethylphosphonate of Example 7, part A, diethyl p-[N,N-bis-(2-chloroethyl)-amino]-phenethylphosphonate is obtained.

EXAMPLE 9

*Preparation of Diethyl p-[N,N-Bis-(2-Bromoethyl)-Amino]-Phenethylphosphonate*

Following the procedure of Example 3, substituting the diethyl p-[N,N-bis-(2-hydroxyethyl)-amino]-benzylphosphonate by the diethyl p-[N,N - bis - (2 - hydroxyethyl)-amino]-phenethylphosphonate of Example 7, part A, diethyl p-[N,N-bis-(2-bromoethyl)-amino]-phenethylphosphonate is obtained.

EXAMPLE 10

A. Preparation of Diethyl p-[N,N-Bis-(2-Hydroxyethyl)-Amino]-α-Methylbenzylphosphonate Into a two-liter, three-necked flask fitted with a stirrer were placed 161.5 grams (0.63 mole) of diethyl p-amino-α-methylbenzylphosphonate, 630 milliliters of chilled (about five degrees centigrade) one normal acetic acid, and 264 grams (six moles) of chilled (about five degrees centigrade) ethylene oxide. The flask was stoppered loosely and allowed to stand for sixteen hours at 25 degrees centigrade. The flask was then suspended in a water-bath at thirty degrees centigrade while the excess ethylene oxide was distilled under reduced pressure. The reaction mixture was cooled in an ice bath and made alkaline with aqueous sodium carbonate. The mixture was extracted with three 300-milliliter portions of methylene chloride and the combined extracts dried over anhydrous magnesium sulfate. After filtering the solution, the solvent was distilled under reduced pressure at a pot temperature of about thirty degrees centigrade, yielding 217 grams (about 100 percent yield) of diethyl p-[N,N-bis - (2 - hydroxyethyl) - amino] - α - methylbenzylphosphonate as a clear amber oil.

B. *Preparation of Diethyl p-[N,N-Bis-(2-Mesyloxyethyl)-Amino]-α-Methylbenzylphosphonate*

Following the procedure of Example 1, part B, substituting 229 grams (0.66 mole) of the diethyl p-[N,N-bis-(2-hydroxyethyl)-amino]-α-methylbenzylphosphonate of part A for the diethyl p-[N,N-bis-(2-hydroxyethyl)-amino]-benzylphosphonate, and using 208 grams (1.82 moles) of mesyl chloride, three liters of dry benzene, 226 grams (2.86 moles) of dry pyridine, and three 300-milliliter portions of methylene chloride, there was obtained 319 grams (about 96 percent yield) of diethyl p-[N,N-bis-(2-mesyloxyethyl)-amino]-α-methylbenzylphosphonate as a dark amber oil.

Instead of using mesyl chloride as in part B above, other sulfonic acid halides capable of introducing a leaving group can be used, for example, ethanesulfonyl chloride or a like lower-alkyl sulfonyl chloride, p-toluenesulfonyl chloride (tosyl chloride), p-bromophenylsulfonyl chloride (brosyl chloride), benzenesulfonyl chloride, and benzylsulfonyl chloride. The bis-(2-sulfonyloxyethyl) compounds so obtained can be used in lieu of the bis-(2-mesyloxyethyl) compound for the indirect iodination of part C below.

C. *Preparation of Diethyl p-[N,N-bis-(2-Iodoethyl)-Amino]-α-Methylbenzylphosphonate*

Following the procedure of Example 1, part C, substituting 319 grams (0.64 mole) of the diethyl p-[N,N-bis - (2 - mesyloxyethyl) - amino] - α - methylbenzylphosphonate of part B for the diethyl p-[N,N-bis-(2-mesyloxyethyl)-amino]-benzylphosphonate, and using 300 grams (2.00 moles) of sodium iodide and four liters of acetone, diethyl p-[N,N-bis-(2-iodoethyl)-amino]-α-methylbenzylphosphonate was obtained as a dark amber oil that solidified on standing and on recrystallization from petroleum ether had a melting point of 80–82 degrees centigrade.

The bis-(2-iodoethyl) compound of this example can also be prepared by substituting the bis-(2-mesyloxyethyl) starting material by the corresponding bis-(2-chloroethyl) or bis-(2-bromoethyl) compound.

EXAMPLE 11

*Preparation of Diethyl p-[N,N-bis-(2-Chloroethyl)-Amino]-α-Methylbenzylphosphonate*

Following the procedure of Example 2, substituting the diethyl p-[N,N-(2-hydroxyethyl)-amino]-benzylphosphonate by the diethyl p-[N,N-bis-(2-hydroxyethyl)-amino]-α-methylbenzylphosphonate of Example 10, part A, diethyl p-[N,N-bis-(2-chloroethyl)-amino]-α-methylbenzylphosphonate was obtained as a white solid melting at 61–62 degrees centigrade.

*Analysis.*—Calc'd for $C_{16}H_{26}Cl_2NO_3P$: C, 50.27; H, 6.86; N, 3.66; Cl, 18.55; P, 8.10. Found: C, 50.35; H, 7.16; N, 3.60; Cl, 18.40; P, 7.46.

EXAMPLE 12

*Preparation of Diethyl p-[N,N-bis-(2-Bromoethyl)-Amino]-α-Methylbenzylphosphonate*

Following the procedure of Example 3, substituting the diethyl p-[N,N-bis-(2-hydroxyethyl)-amino]-benzylphosphonate by the diethyl p-[N,N-bis-(2-hydroxyethyl)-amino]-α-benzylphosphonate by the diethyl p-[N,N-bis-(2-hydroxyethyl)-amino]-α-methylbenzylphosphonate of Example 10, part A, diethyl p-[N,N-bis-(2-bromoethyl)-amino]-α-methylbenzylphosphonate is obtained.

EXAMPLE 13

A. *Preparation of Dimethyl p-[N,N-bis-(2-Hydroxyethyl)-Amino]-Phenylphosphonate*

Following the procedure of Example 1, part A, substituting dimethyl p-aminophenylphosphonate for the diethyl p-aminobenzylphosphonate, dimethyl p-[N,N-bis-(2 - hydroxyethyl) - amino] - phenylphosphonate was obtained.

*Analysis.*—Calc'd for $C_{12}H_{20}NO_5P$: N, 4.84; P, 10.79. Found: N, 4.55; P, 10.37.

B. *Preparation of Dimethyl p-[N,N-bis-(2-Mesyloxyethyl)-Amino]-Phenylphosphonate*

Following the procedure of Example 1, part B, substituting the dimethyl p - [N,N - bis - (2 - hydroxyethyl)-amino]-phenylphosphonate of part A for the diethyl p - [N,N - bis - (2 - hydroxyethyl) - amino] - benzylphosphonate, dimethyl p[N,N-bis-(2-mesyloxyethyl)-amino]-phenylphosphonate was obtained.

Instead of using mesyl chloride as in part B above, other sulfonic acid halides capable of introducing a leaving group can be used, for example, ethanesulfonyl chloride or a like lower-alkyl sulfonyl chloride, p-toluenesulfonyl chloride (tosyl chloride), p-bromophenylsulfonyl chloride (brosyl chloride), benzenesulfonyl chloride, and benzylsulfonyl chloride. The bis-(2-sulfonyloxyethyl) compounds so obtained can be used in lieu of the bis-(2-mesyloxyethyl) compound for the indirect iodination of part C below.

C. *Preparation of Dimethyl p-[N,N-bis-(2-Iodoethyl)-Amino]-Phenylphosphonate*

Following the procedure of Example 1, part C, substituting the dimethyl p-[N,N - bis - (2 - mesyloxyethyl)-amino]-phenylphosphonate of part B for the diethyl p-[N,N - bis - (2 - mesyloxyethyl) - amino] - benzylphosphonate, dimethyl p-[N,N - bis - (2 - iodoethyl) - amino]-phenylphosphonate was obtained.

The bis-(2-iodoethyl) compound of this example can also be prepared by substituting the bis-(2-mesyloxyethyl) starting material by the corresponding bis-(2-chloroethyl) or bis-(2-bromoethyl) compound.

EXAMPLE 14

*Preparation of Dimethyl p-[N,N-bis-(2-Chloroethyl)-Amino]-Phenylphosphonate*

Following the procedure of Example 2, substituting the diethyl p-[N,N-bis-(2-hydroxyethyl)-amino]-benzylphosphonate by the dimethyl p-[N,N-bis-(2-hydroxy)-amino]-phenylphosphonate of Example 13, part A, dimethyl p-[N,N-bis-(2-chloroethyl)-amino]-phenylphosphonate is obtained.

EXAMPLE 15

*Preparation of Dimethyl p-[N,N-bis-(2-Bromoethyl)-Amino]-Phenylphosphonate*

Following the procedure of Example 3, substituting the diethyl p-[N,N-bis-(2-hydroxyethyl)-amino]-benzylphosphonate by the dimethyl p-[N,N-bis-(2-hydroxyethyl)-amino]-phenylphosphonate of Example 13, part A, dimethyl p - [N,N-bis-(2-bromoethyl)-amino]-phenylphosphonate is obtained.

EXAMPLES 16 THROUGH 20

Following the procedures of Examples 1, 2, and 3, substituting the diethyl p-aminobenzylphosphonate by di-n- propyl m-aminobenzylphosphonate, the following compounds are obtained:

Di-n-propyl m-[N,N-bis-(2-hydroxyethyl)-amino]-benzylphosphonate; di-n-propyl m-[N,N-bis-(2-mesyloxyethyl)-amino]-benzylphosphonate; di-n-propyl m-[N,N-bis-(2-iodoethyl)-amino]-benzylphosphonate; di-n-propyl m-[N,N-bis-(2-chloroethyl)-amino]-benzylphosphonate; and di-n-propyl m - [N,N-bis-(2-bromoethyl)-amino]-benzylphosphonate.

EXAMPLES 21 THROUGH 25

Following the procedures of Examples 1, 2, and 3, substituting the diethyl p-aminobenzylphosphonate by di-n-butyl o-aminophenethylphosphonate, the following compounds are obtained:

Di-n-butyl o-[N,N-bis-(2-hydroxyethyl)-amino] - phenethylphosphonate; di-n-butyl o-[N,N-bis-(2-mesyloxyethyl)-amino]-phenethylphosphonate; di-n-butyl o-[N,N-bis-(2-iodoethyl)-amino]-phenethylphosphonate; di - n - butyl o-[N,N - bis - (2 - chloroethyl) - amino] - phenethylphosphonate; and di-n-butyl o - [N,N - bis - (2 - bromoethyl)-amino]-phenethylphosphonate.

EXAMPLE 26

*Preparation of p-[N,N-bis-(2-Hydroxyethyl)-Amino]-Benzylphosphonic Acid*

A mixture of 33.1 grams (0.1 mole) of the diethyl p-[N,N-bis-(2-hydroxyethyl)amino] - benzylphosphonate of Example 1, part A, and 100 milliliters of concentrated (37 percent) hydrochloric acid are heated on a steam bath for four hours. The reaction mixture is evaporated to dryness under vacuum, yielding p-[N,N-bis-(2-hydroxyethyl)-amino]-benzylphosphonic acid.

B. *Preparation of p-[N,N-bis-(2-Mesyloxyethyl)-Amino]-Benzylphosphonic Acid*

One-tenth mole (27.5 grams) of the p-[N,N-bis-(2-hydroxyethyl)-amino]-benzylphosphonic acid of part A and 200 milliliters of pyridine are mixed and cooled to ten degrees centigrade. To this mixture is added 48.1 grams (0.42 mole) of mesyl chloride dropwise and the reaction mixture is stirred for sixteen hours at 25 degrees centigrade. Excess pyridine is removed under reduced pressure, and the residual oil is dissolved in methylene chloride. The methylene chloride solution is washed with dilute hydrochloric acid (22 percent) in order to remove the remaining pyridine and to hydrolyze any mixed anhydride formed, then with water until the washings are neutral, dried over anhydrous magnesium sulfate, filtered, and evaporated to dryness, yielding p-[N,N-bis-(2-mesyloxyethyl)-amino]-benzylphosphonic acid.

Instead of using mesyl chloride as in part B above, other sulfonic acid halides capable of introducing a leaving group can be used, for example, ethanesulfonyl chloride or a like lower-alkyl sulfonyl chloride, p-toluenesulfonyl chloride (tosyl chloride), p-bromophenylsulfonyl chloride (brosyl chloride), benzenesulfonyl chloride, and benzylsulfonyl chloride. The bis-(2-sulfonyloxyethyl) compounds so obtained can be used in lieu of the bis-(2-mesyloxyethyl) compound for the indirect iodination of part C below.

C. *Preparation of p-[N,N-bis-(2-Iodoethyl)-Amino]-Benzylphosphonic Acid*

To a solution of 29.4 grams (0.07 mole) of the p-[N,N-bis-(2-mesyloxyethyl)-amino] - benzylphosphonic acid of part B in 200 milliliters of acetone are added 200 milliliters of acetone containing 45 grams (0.30 mole) of sodium iodide. The reaction mixture is stored in the dark in an atmosphere of nitrogen for seven days at 25 degrees centigrade. After filtration, the acetone is removed by vacuum distillation and the residual oily solid is taken up in 200 milliliters of methylene chloride. This solution is filtered and washed three times with 100-milliliter portions of ten percent aqueous sodium thiosulfate, followed by three washings with 100-milliliter portions of water. The methylene chloride solution is dried over anhydrous magnesium sulfate, filtered, and evaporated under vacuum to yield the desired p-[N,N-bis-(2-iodoethyl)-amino]-benzylphosphonic acid.

The bis-(2-iodoethyl) compound of this example can also be prepared by substituting the bis-(2-mesyloxyethyl) starting material by the corresponding bis-(2-chloroethyl) or bis-(2-bromoethyl) compound.

D. *Preparation of Disodium p-[N,N-bis-(2-Iodoethyl)-Amino]-Benzylphosphonate*

A portion (4.95 grams) of the p-[N,N-bis-(2-iodoethyl)-amino]-benzylphosphonic acid of part C is added to thirty milliliters of dimethylformamide. To this mixture is added a solution containing 1.68 grams of sodium bicarbonate in twenty milliliters of water. The reaction mixture is stirred vigorously for 72 hours at 25 degrees centigrade. Upon evaporation of the solvents under vacuum, disodium p-[N,N-bis-(2-iodoethyl)-amino]-benzylphosphonate is obtained.

EXAMPLE 27

*Preparation of p-[N,N-bis-(2-Chloroethyl)-Amino]-Benzylphosphonic Acid*

Following the procedure of Example 2, substituting the diethyl p-[N,N-bis-(2-hydroxyethyl)-amino]-benzylphosphonate by the p-[N,N-bis-(2-hydroxyethyl)-amino]-benzylphosphonic acid of Example 26, part A, p-[N,N-bis-(2-chloroethyl)-amino]-benzylphosphonic acid is obtained.

EXAMPLE 28

*Preparation of p-[N,N-bis-(2-Bromoethyl)-Amino]-Benzylphosphonic Acid*

Following the procedure of Example 3, substituting the diethyl p-[N,N-bis-(2-hydroxyethyl)-amino]-benzylphosphonate by the p-[N,N-bis-(2-hydroxyethyl)-amino]-benzylphosphonic acid of Example 26, part A, p-[N,N-bis-(2-bromoethyl)-amino]-benzylphosphonic acid is obtained.

EXAMPLE 29

A. *Preparation of Monoethyl p-[N,N-bis-(2-Hydroxyethyl)-Amino]-Benzylphosphonate*

One-tenth mole (33.1 grams) of the diethyl p-[N,N-bis-(2-hydroxyethyl)-amino]-benzylphosphonate of Example 1, part A, is mixed with sixteen grams of sodium hydroxide and 100 milliliters of water. The reaction mixture is heated on a steam bath for eight hours, cooled in an ice bath while being adjusted to pH 6 with hydrochloric acid, and extracted with chloroform. The aqueous phase is then concentrated under reduced pressure on a film evaporator, yielding monoethyl p-[N,N-bis-(2-hydroxyethyl)-amino]-benzylphosphonate admixed with sodium chloride.

B. *Preparation of Monoethyl p-[N,N-bis-(2-Mesyloxyethyl)-Amino]-Benzylphosphonate*

A mixture of 25 grams of the monoethyl ester of part A and 200 milliliters of pyridine is stirred and cooled to ten degrees centigrade. Thirty grams of mesyl chloride is added dropwise over a one-half hour period, and the mixture is stirred for sixteen hours at 25 degrees centigrade. The pyridine is then removed under reduced pressure, and the residual oil is dissolved in methylene chloride. This solution is washed with dilute (22 percent) hydrochloric acid and then with water until the washings are neutral. The methylene chloride solution is dried, filtered, and evaporated, yielding monoethyl p-[N,N-bis-(2-mesyloxyethyl)-amino]-benzylphosphonate.

Instead of using mesyl chloride as in part B above, other sulfonic acid halides capable of introducing a leaving group can be used, for example, ethanesulfonyl chloride or a like lower-alkyl sulfonyl chloride, p-toluenesulfonyl chloride (tosyl chloride), p-bromophenylsulfonyl chloride (brosyl chloride), benzenesulfonyl chloride, and benzylsulfonyl chloride. The bis-(2-sulfonyloxyethyl) compounds so obtained can be used in lieu of the bis-(2-mesyloxyethyl) compound for the indirect iodination of part C below.

C. Preparation of Monoethyl p-[N,N-bis-(2-Iodoethyl)-Amino]-Benzylphosphonate A solution of 26.8 grams of the monoethyl p[N,N-bis-(2-mesyloxyethyl)amino]-benzylphosphonate of part B in 200 milliliters of acetone is mixed with a solution of thirty grams of sodium iodide in 200 milliliters of acetone. The reaction mixture is stored in the dark in an atmosphere of nitrogen for seven days at 25 degrees centigrade. After filtration, the acetone is removed under reduced pressure, and the residual oily solid is taken up in 200 milliliters of methylene chloride. The resulting solution is filtered and then washed with three 100-milliliter portions of ten percent aqueous sodium thiosulfate, followed by three 100-milliliter portions of water. The methylene chloride solution is dried over anhydrous magnesium sulfate, filtered, and concentrated under reduced pressure, yielding the desired monoethyl p-[N,N-bis-(2-iodoethyl)-amino]-benzylphosphonate.

The bis-(2-iodoethyl) compound of this example can also be prepared by substituting the bis-(2-mesyloxyethyl) starting material by the corresponding bis-(2-chloroethyl) or bis-(2-bromoethyl) compound.

D. Preparation of Sodium Monoethyl p-[N,N-bis-(2-Iodoethyl)-Amino]-Benzylphosphonate A quantity (10.5) grams of the monoethyl p-[N,N-bis-(2-iodoethyl)-amino]-benzylphosphonate of part C is added to sixty milliliters of dimethylformamide, and to this is added a solution of 1.7 grams of sodium bicarbonate in twenty milliliters of water. The reaction mixture is vigorously stirred for 72 hours at 25 degrees centigrade. The solvents are then removed under reduced pressure, yielding sodium monoethyl p - [N,N-bis-(2-iodoethyl)-amino]-benzylphosphonate.

EXAMPLE 30

*Preparation of Monoethyl p-[N,N-bis-(2-Chloroethyl)-Amino]-Benzylphosphonate*

Following the procedure of Example 2, substituting the diethyl p-[N,N-bis-(2-hydroxyethyl)-amino]-benzylphosphonate by the monoethyl p-[N,N-bis-(2-hydroxyethyl)-amino]-benzylphosphonate of Example 29, part A, monoethyl p-[N,N-bis-(2-chloroethyl)-amino]-benzylphosphonate is obtained.

EXAMPLE 31

*Preparation of Monoethyl p-[N,N-bis-(2-Bromoethyl)-Amino]-Benzylphosphonate*

Following the procedure of Example 3, substituting the diethyl p-[N,N-bis-(2-hydroxyethyl)-amino]-benzylphosphonate by the monoethyl p-[N,N-bis-(2-hydroxyethyl)-amino]-benzylphosphonate of Example 29, part A, monoethyl p-[N,N-bis-(2-bromoethyl)-amino]-benzylphosphonate is obtained.

EXAMPLE 32

*Preparation of Calcium p-[N,N-bis-(2-Iodoethyl)-Amino]-Benzylphosphonate*

A quantity (4.95 grams) of the p-[N,N-bis-(2-iodoethyl)-amino]-benzylphosphonic acid of Example 26, part C, is dissolved in 25 milliliters of anhydrous ethyl alcohol to which is added one gram of calcium carbonate. After standing for a day, the alcohol is evaporated on a steam bath, yielding calcium p-[N,N-bis-(2-iodoethyl)-amino]-benzylphosphonate.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound of the formula:

$$\begin{array}{c} X-CH_2-CH_2 \\ \phantom{X-CH_2-CH}N \\ X-CH_2-CH_2 \end{array} \!\!\!\!\diagup\!\!\!\!\diagdown\!\!\!\!- C_nH_{2n}-\overset{\overset{O}{\|}}{P}\!\!\diagup\!\!\!\begin{array}{c}O\text{-lower-alkyl}\\O\text{-lower-alkyl}\end{array}$$

wherein X is a halogen having an atomic weight between 35 and 127, and $n$ is an integer from zero to eight, inclusive.

2. Diethyl p - [N,N-bis-(2-iodoethyl)-amino]-benzylphosphonate.
3. Diethyl p - [N,N - bis-(2-iodoethyl)-amino]-phenethylphosphonate.
4. Diethyl p-[N,N-bis-(2-iodoethyl)-amino]-α-methylbenzylphosphonate.
5. Diethyl 3 - {p - [N,N - bis - (2-iodoethyl)-amino]-phenyl}-propylphosphonate.
6. Diethyl p-[N,N-bis-(2-chloroethyl)-amino]-benzylphosphonate.
7. Dimethyl p - [N,N - bis - (2-chloroethyl)-amino]-phenylphosphonate.
8. Diethyl p-[N,N-bis-(2-chloroethyl)-amino]-α-methylbenzylphosphonate.
9. Diethyl 3 - {p - [N,N - bis-(2-chloroethyl)-amino]-phenyl}-propylphosphonate.
10. A compound of the formula:

$$\begin{array}{c} X-CH_2-CH_2 \\ \phantom{X-CH_2-CH}N \\ X-CH_2-CH_2 \end{array} \!\!\!\!\diagup\!\!\!\!\diagdown\!\!\!\!- C_nH_{2n}-\overset{\overset{O}{\|}}{P}\!\!\diagup\!\!\!\begin{array}{c}OH\\OH\end{array}$$

wherein X is a halogen having an atomic weight between 35 and 127, and $n$ is an integer from zero to eight, inclusive.

11. A compound according to claim 10 in which at least one of the acidic hydrogens is replaced by a pharmacologically acceptable cation.

12. A compound of the formula:

$$\begin{array}{c} X-CH_2-CH_2 \\ \phantom{X-CH_2-CH}N \\ X-CH_2-CH_2 \end{array} \!\!\!\!\diagup\!\!\!\!\diagdown\!\!\!\!- C_nH_{2n}-\overset{\overset{O}{\|}}{P}\!\!\diagup\!\!\!\begin{array}{c}O\text{-lower-alkyl}\\OH\end{array}$$

wherein X is a halogen having an atomic weight between 35 and 127, and $n$ is an integer from zero to eight, inclusive.

13. A compound according to claim 12 in which the acidic hydrogen is replaced by a pharmacologically acceptable cation.

14. A compound of the formula:

$$\begin{array}{c} HO-CH_2-CH_2 \\ \phantom{HO-CH_2-CH}N \\ HO-CH_2-CH_2 \end{array} \!\!\!\!\diagup\!\!\!\!\diagdown\!\!\!\!- C_nH_{2n}-\overset{\overset{O}{\|}}{P}\!\!\diagup\!\!\!\begin{array}{c}O\text{-lower-alkyl}\\O\text{-lower-alkyl}\end{array}$$

wherein $n$ is an integer from zero to eight, inclusive.

15. Diethyl p-[N,N-bis-(2-hydroxyethyl)-amino]-benzylphosphonate.
16. Diethyl p - [N,N - bis - (2-hydroxyethyl)-amino]-phenethylphosphonate.
17. Diethyl p - [N,N - bis-(2-hydroxyethyl)-amino]-α-methylbenzylphosphonate.
18. Diethyl 3 - {p-[N,N-bis-(2-hydroxyethyl)-amino]-phenyl}-propylphosphonate.
19. Dimethyl p - [N,N - bis - (2-hydroxyethyl)-amino]-phenylphosphonate.

20. A compound of the formula:

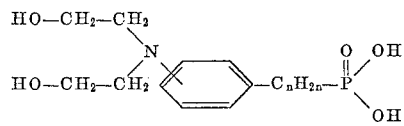

wherein *n* is an integer from zero to eight, inclusive.

21. A compound of the formula:

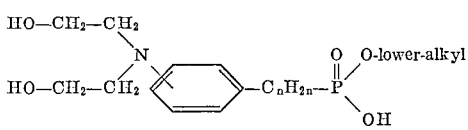

wherein *n* is an integer from zero to eight, inclusive.

22. A compound of the formula:

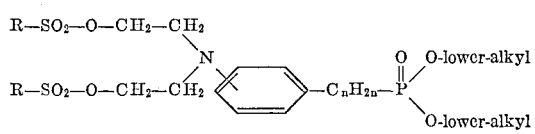

wherein *n* is an integer from zero to eight, inclusive, and R is selected from the group consisting of lower-alkyl, p-tolyl, p-bromophenyl, phenyl, and benzyl.

23. Diethyl p-[N,N-bis-(2-mesyloxyethyl)-amino]-benzylphosphonate.

24. Diethyl p-[N,N-bis-(2 - mesyloxyethyl) - amino]-phenethylphosphonate.

25. Diethyl p-[N,N-bis-(2 - mesyloxyethyl)-amino]-α-methylbenzylphosphonate.

26. Diethyl 3-{p-[N,N-bis-(2-mesyloxyethyl)-amino]-phenyl}-propylphosphonate.

27. A compound of the formula:

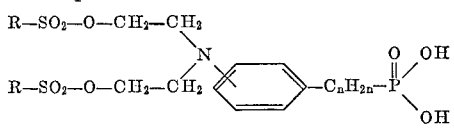

wherein *n* is an integer from zero to eight, inclusive, and R is selected from the group consisting of lower-alkyl, p-tolyl, p-bromophenyl, phenyl, and benzyl.

28. A compound of the formula:

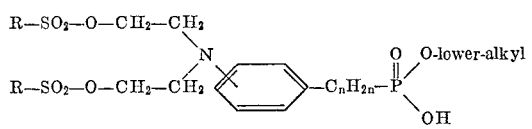

wherein *n* is an integer from zero to eight, inclusive, and R is selected from the group consisting of lower-alkyl, p-tolyl, p-bromophenyl, phenyl, and benzyl.

29. A process for the preparation of a dialkyl N,N-bis-(2-hydroxyethyl)-aminoaromaticphosphonate of the formula:

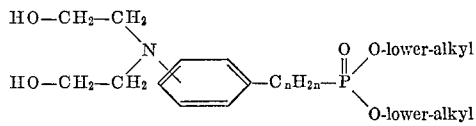

where *n* is an integer from zero to eight, inclusive, which comprises alkylating a dialkyl aminoaromaticphosphonate of the formula:

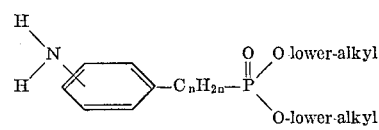

wherein *n* is an integer from zero to eight, inclusive, with a 2-hydroxyethylating agent to obtain the said dialkyl N,N-bis-(2-hydroxyethyl)-aminoaromaticphosphonate.

30. A process for the preparation of a dialkyl N,N-bis-(2-R-sulfonyloxyethyl)-aminoaromaticphosphonate of the formula:

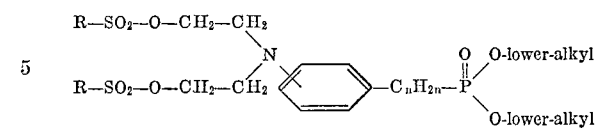

wherein *n* is an integer from zero to eight, inclusive, and R is selected from the group consisting of lower-alkyl, p-tolyl, p-bromophenyl, phenyl, and benzyl which comprises the steps of alkylating a dialkyl aminoaromaticphosphonate of the formula:

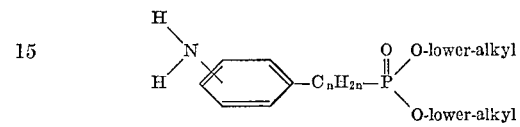

wherein *n* is an integer from zero to eight, inclusive, with a 2-hydroxyethylating agent, and condensing the dialkyl N,N-bis - (2 - hydroxyethyl) - aminoaromaticphosphonate thus obtained with an R-sulfonyl halide to give the said dialkyl N,N-bis-(2 - R-sulfonyloxyethyl)-aminoaromaticphosphonate.

31. A process for the preparation of a dialkyl N,N-bis-(2-mesyloxyethyl)-aminoaromaticphosphonate of the formula:

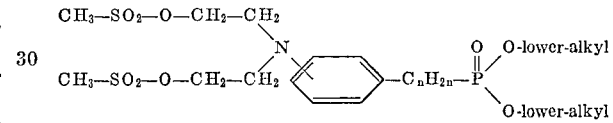

wherein *n* is an integer from zero to eight, inclusive, which comprises the steps of alkylating a dialkyl aminoaromaticphosphonate of the formula:

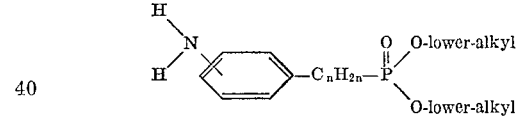

wherein *n* is an integer from zero to eight, inclusive, with a 2-hydroxyethylating agent, and condensing the dialkyl N,N-bis-(2 - hydroxyethyl) - aminoaromaticphosphonate thus obtained with a mesyl halide to give the said dialkyl N,N-bis-(2-mesyloxyethyl)-aminoaromaticphosphonate.

32. A process for the preparation of a dialkyl N,N-bis-(2-haloethyl)-aminoaromaticphosphonate of the formula:

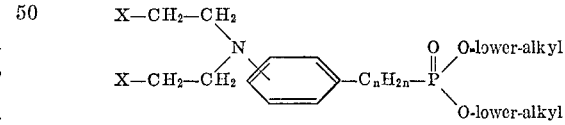

wherein X is a halogen having an atomic weight between 35 and 127, *n* is an integer from zero to eight, inclusive, which comprises alkylating a dialkyl aminoaromaticphosphonate of the formula:

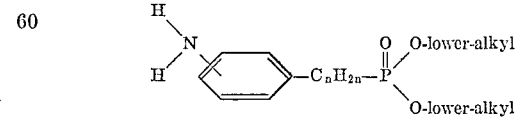

wherein *n* is an integer from zero to eight, inclusive, with a 2-hydroxyethylating agent, and halogenating the dialkyl N,N-bis-(2 - hydroxyethyl) - aminoaromaticphosphonate thus obtained to form the said dialkyl N-N-bis-(2-haloethyl)-aminoaromaticphosphonate.

33. The process of claim 32 wherein halogenation is accomplished by condensing the dialkyl N,N-bis-(2-hydroxyethyl)-aminoaromaticphosphonate with an R-sulfonyl halide, wherein R is selected from the group consisting of lower-alkyl, p-tolyl, p-bromophenyl, phenyl, and benzyl groups, and reacting the dialkyl N,N-bis-(2-

R-sulfonyloxyethyl)-aminoaromaticphosphonate thus obtained with an alkali metal iodide.

34. The process of claim 32 wherein halogenation is accomplished by condensing the dialkyl N,N-bis-(2-hydroxyethyl)-aminoaromaticphosphonate with a mesyl halide and reacting the dialkyl N,N-bis-(2-mesyloxyethyl)-aminoaromaticphosphonate thus obtained with an alkali metal iodide.

35. The process of claim 32 wherein halogenation is accomplished with a mixture of chloroform, pyridine hydrohalide, pyridine, and a thionyl halide selected from the group consisting of thionyl chloride and thionyl bromide.

36. A process for the preparation of a dialkyl N,N-bis-(2-iodoethyl)-aminoaromaticphosphonate of the formula:

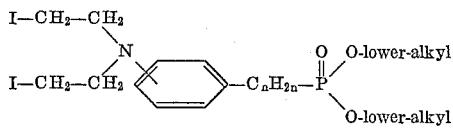

wherein $n$ is an integer from zero to eight, inclusive, which comprises reacting a compound of the formula:

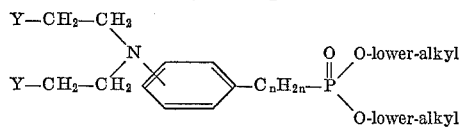

wherein Y is a member of the group consisting of chlorine, bromine, lower-alkylsulfonyloxy, tosyloxy, brosyloxy, phenylsulfonyloxy, and benzylsulfonyloxy groups, and $n$ is an integer from zero to eight, inclusive, with an alkali metal iodide.

37. A process for the preparation of a dialkyl N,N-bis-(2-haloethyl)-aminoaromaticphosphonate of the formula:

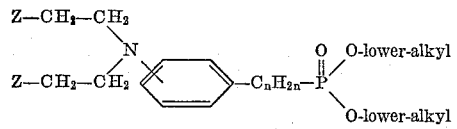

wherein Z is a member selected from the group consisting of chlorine and bromine and $n$ is an integer from zero to eight, inclusive, which comprises reacting a compound of the formula:

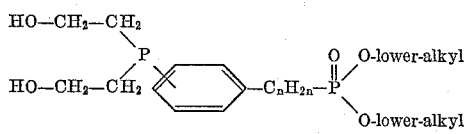

wherein $n$ is an integer from zero to eight, inclusive, with a mixture of chloroform, pyridine hydrohalide, pyridine, and a thionyl halide selected from the group consisting of thionyl chloride and thionyl bromide to form the said dialkyl N,N-bis-(2-haloethyl)aminoaromaticphosphonate.

38. A process for preparing a dialkyl N,N-bis-(2-R-sulfonyloxyethyl)-aminoaromaticphosphonate of the formula:

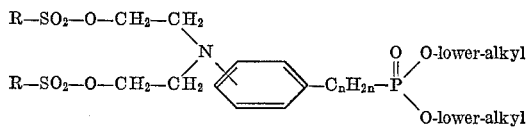

wherein $n$ is an integer from zero to eight, inclusive and R is selected from the group consisting of lower-alkyl, p-tolyl, p-bromophenyl, phenyl, and benzyl, which comprises condensing a compound of the formula:

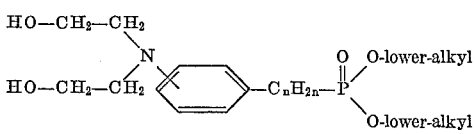

wherein $n$ is an integer from zero to eight, inclusive, with an R-sulfonyl halide to form the said dialkyl N,N-bis-(2-R-sulfonyloxyethyl)-aminoaromaticphosphonate.

39. A process for preparing a dialkyl N,N-bis-(2-mesyloxyethyl)-aminoaromaticphosphonate of the formula:

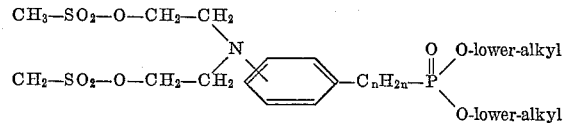

wherein $n$ is an integer from zero to eight, inclusive, which comprises condensing a compound of the formula:

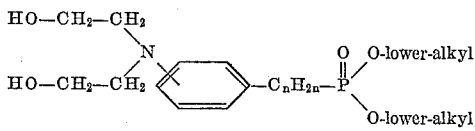

wherein $n$ is an integer from zero to eight, inclusive, with a mesyl halide to form the said dialkyl N,N-bis-(2-mesyloxyethyl)-aminoaromaticphosphonate.

References Cited in the file of this patent
UNITED STATES PATENTS
2,638,478    Morrison et al. _____ May 12, 1953

UNITED STATES PATENT OFFICE
CERTIFICATE OF CORRECTION

Patent No. 3,134,800                            May 26, 1964

Fred Kagan et al.

It is hereby certified that error appears in the above numbered patent requiring correction and that the said Letters Patent should read as corrected below.

Column 2, line 26, for "cocentration" read -- concentration --; column 7, line 8, for "bosyl" read -- brosyl --; column 9, line 60, for "p-[N,N-(2-" read -- p-[N,N-bis-(2- --; column 10, lines 1 and 2, strike out "by the diethyl p-[N,N-bis-(2-hydroxyethyl)-amino]-α-benzylphosphonate"; line 25, for "p[" read -- p-[ --; same column 10, line 57, for "(2-hydroxy)-amino" read -- (2-hydroxy-ethyl)-amino --; column 14, lines 5 to 10, for that portion of the formula reading

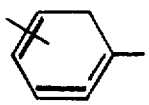       read      

column 17, lines 45 to 50, upper left-hand portion of the formula, for

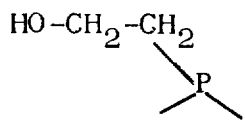      read      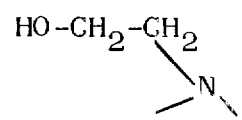

Signed and sealed this 17th day of November 1964.

(SEAL)
Attest:

ERNEST W. SWIDER                          EDWARD J. BRENNER
Attesting Officer                          Commissioner of Patents